United States Patent [19]

Drinkard, Jr. et al.

[11] 3,853,948

[45] *Dec. 10, 1974

[54] CATALYTIC ISOMERIZATION OF 2-METHYL-3-BUTENENITRILE TO LINEAR PENTENE-NITRILES

[75] Inventors: William C. Drinkard, Jr., Orange, Tex.; Richard V. Lindsey, Hockessin, Del.

[73] Assignee: E. I. du Pont de Nemours & Company, Wilmington, Del.

[ * ] Notice: The portion of the term of this patent subsequent to Oct. 27, 1987, has been disclaimed.

[22] Filed: Sept. 5, 1972

[21] Appl. No.: 286,131

Related U.S. Application Data

[63] Continuation-in-part of Ser. No. 77,725, Oct. 2, 1970, abandoned, which is a continuation-in-part of Ser. No. 678,171, Oct. 26, 1967, Pat. No. 3,536,748, which is a continuation-in-part of Ser. No. 509,432, Nov. 23, 1965, Pat. No. 3,496,215.

[52] U.S. Cl. ............................................. 260/465.9
[51] Int. Cl. .................... C07c 121/02, C07c 121/30
[58] Field of Search ................................. 260/465.9

[56] References Cited
UNITED STATES PATENTS

| | | | |
|---|---|---|---|
| 3,536,748 | 10/1970 | Drinkard, Jr. et al. | 260/465.9 |
| 3,564,040 | 2/1971 | Downing et al. | 260/465.9 X |
| 3,676,475 | 7/1972 | Drinkard, Jr. et al. | 260/465.9 X |
| 3,686,264 | 8/1972 | Albanese et al. | 260/465.3 |
| 3,697,578 | 10/1972 | Pasquino et al. | 260/465.9 |

*Primary Examiner*—Joseph P. Brust

[57] ABSTRACT

The present invention relates to the isomerization of 2-methyl-3-butenenitrile to linear pentenenitriles by means of a catalyst of a zero-valent nickel complex using an excess of neutral ligand over that required to form the zero-valent nickel complex.

5 Claims, No Drawings

CATALYTIC ISOMERIZATION OF 2-METHYL-3-BUTENENITRILE TO LINEAR PENTENE-NITRILES

CROSS-REFERENCE TO RELATED APPLICATIONS

This application is a continuation-in-part of patent application Ser. No. 77,725, filed on Oct. 2, 1970 by William C. Drinkard, Jr. and Richard V. Lindsey, Jr. (now abandoned) which in turn is a continuation-in-part of patent application, Ser. No. 678,171, filed on Oct. 26, 1967 by the same inventors and now U.S. Pat. No. 3,536,748, which in turn is a continuation-in part of Pat. application Ser. No. 509,432, filed Nov. 23, 1965 by the same inventors, now U.S. Pat. No. 3,496,215.

BACKGROUND OF THE INVENTION

The hydrocyanation of olefinically unsaturated compounds such as butadiene in the presence of certain zero-valent nickel complexes with a neutral ligand such as triphenyl phosphile is described and claimed in U.S. Pat. No. 3,496,215. The isomerization of 2-methyl-3-butenetrile in the presence of that catalyst system is described and claimed in copending application, Ser. No. 678,171, now U.S. Pat. No. 3,536,748.

The process of isomerization is not disclosed in U.S. Pat. No. 3,496,215 but essential operating conditions for the same are set forth in Example XIII of that patent, which described contacting 2-methyl-3-butenenitrile with tetrakis(triphenyl phosphite)nickel(0) at 100°C. prior to addition of hydrogen cyanide.

There is also disclosed at Column 3, of U.S. Pat. No. 3,536,748, the use of an excess of certain neutral ligands in carrying out the isomerization reaction. This is further illustrated in Examples 5–7, wherein there is employed an excess of neutral ligand over that required to form the zerovalent nickel complex.

It is the purpose of this application to make claim to a process of isomerizing 2-methyl-3-butenenitrile to linear pentenenitriles in the presence of a zero-valent nickel complex using an excess of neutral ligand over that required to form the nickel complex.

SUMMARY OF THE INVENTION

The process of this invention provides a method of preparing linear pentenenitriles by contacting 2-methyl-3-butenenitrile with a zero-valent nickel complex and at least a one mole excess of neutral ligand over that required in the nickel complex at a temperature in the range of 10°–200°C. The process is carried out in the absence of a promoter such as zinc chloride.

The nickel complexes are nickel compounds of the general formula $Ni(PXYZ)_4$ wherein nickel is complexed with the neutral ligand PXYZ and wherein X is OR and Y and Z are selected from the class consisting of R and OR, R being selected from the class consisting of alkyl and aryl groups having up to 18 carbon atoms. If desired, any of X, Y and Z may be cojoined. Examples of divalent cojoined Y and Z are tetramethylene, pentamethylene, and ethylenedioxy groups. The ethylenedioxy group is an example of divalent cojoined X and Y or Z. It is believed that in these nickel compounds (complexes) at least some of the nickel is present in the zero-valent state. The preferred catalysts are the zero-valent nickel complexes in which the neutral ligands P(XYZ) are the aryl phosphites, such as triphenyl phosphite, tris(p-chlorophenyl)phosphite, tris(p-methoxyphenyl)phosphite, tris(p-tolyl)phosphite and mixed tris(m- and p-tolyl)phosphite. Under some of the reaction conditions of the present invention, one or more of the ligands may become dissociated from the nickel. In this specification, however, specific mention of one of the $Ni(PXYZ)_4$ compounds as a catalyst refers to the compound added to the reaction mixture.

The neutral ligands used in excess are defined as in the nickel complexes above and comprise in general phosphites, phosphonites and phosphinites. Typical illustrations include compounds of the formulae $P(OC_6H_5)_3$, $CH_3\ P(OC_6H_5)_2$, $C_6H_5\ P(OC_6H_5)_2$, $CH_3\ P(OC_6H_5)_2$, $(C_6H_5)_2$- $POCH_3$

$(C_6H_5)_2\ POC_6H_5$ and

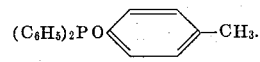

The preferred excess ligands are the aryl phosphites. Generally, the excess ligand is present in at least a 1 molar and preferably a 2 molar excess as based on the nickel complex present. The only limit of excess ligand involves practical considerations for it may even be used as the solvent. However, generally there is little advantage to be obtained in using over a 300 mole excess of ligand as based on one mole of nickel, since the rate of the displacement reaction becomes too slow to be practical due to the decreased concentration of nickel present. This use of excess ligand extends catalyst life by its stabilizing effect on the catalyst system. The extent of stabilization is dependent on the temperature and on the amount of excess ligand present. The excess ligand used may be the same or different from the ligand attached to nickel in the intermediate nickel compound and mixtures of different ligands can be used. The advantage of using excess ligand particularly in its effect on extending catalyst life and increasing conversion becomes evident especially when lower amounts of catalyst are used and may not be observed at high catalyst levels.

The zero-valent nickel catalyst preferably is prepared prior to use. Methods of preparing the catalysts are disclosed in U.S. Pat. Nos. 3,152,158 and 3,328,443 and also in our above-identified application, now U.S. Pat. No. 3,496,215. However, catalyst can also be prepared in situ by placing in the reaction mixture an alkyl or aryl phosphite together with an intermediate zero-valent nickel compound or an intermediate organonickel compound having a nickel-carbon bond. It is not entirely certain what unseparated reaction products are formed in the reaction mixture by the in situ preparation process, although zero-valent nickel is believed always to be present. Consequently, the catalyst formed in such in situ preparations may be referred to simply as a "reaction product."

The intermediate zero-valent nickel compounds which form active catalyst in situ on addition of an alkyl or aryl phosphite can themselves be prepared in situ prior to addition of the phosphite ester. The intermediate zero-valent nickel compounds and also the zero-valent nickel catalysts and catalytic reaction products prepared in situ are characterized by having neutral ligands which are thought to be bonded to the central metal atom by both sigma-and pi-type bonds. This type of bonding is described, for example, in Cotton and Wilkinson (Advanced Inorganic Chemistry, Interscience Publishers, 1962, pp. 602–606).

The process of the invention is normally carried out at atmospheric pressure and at any temperature in the range 10°–200°C., preferably in the range 60°–150°C. The pressure is not critical, however, and can be above or below atmospheric pressure if desired. Any of the conventional batch or continuous flow procedures may be used either in the liquid phase or in the vapor phase (with respect to the relatively volatile 2-methyl-3-butenenitrile reactant and linear pentenenitrile products). The reactor may be of any mechanically and chemically resistant material, and is usually of glass or an inert material or alloy, e.g., nickel, copper, silver, gold, platinum, stainless steel, Monel, Hastelloy, etc.

The process is usually carried out without an added diluent or solvent. Any solvent or diluent that is nondestructive of the catalyst can be used, however. Suitable solvents include aliphatic or aromatic hydrocarbons (hexane, cyclohexane, benzene), ethers (diethyl ether, tetrahydrofuran, dioxane, glycol dimethyl ether, anisole), esters (ethyl acetate, methyl benzoate), nitriles (adiponitrile, benzonitrile), etc.

A nonoxidizing environment is desirable in order to retard oxidative deactivation of the catalyst. Accordingly, an inert atmosphere, e.g., nitrogen, is normally and preferably used, although air may be used if desired at the expense of loss of a proportion of the catalyst through oxidation.

When the process is a typical batch operation in the liquid phase with or without a solvent, the catalytic nickel complex is soluble to some extent at temperatures within the operable range and is usually completely soluble at the most preferred operating temperature. However, the nickel complex is essentially nonvolatile, whereas the 2-methyl-3-butenenitrile reactant and the linear pentenenitrile products are relatively volatile. Accordingly, in a continuous flow procedure the catalyst may be a component of the flowing system in a completely liquid-phase operation, it may be in a mobile nonflowing liquid state in a semi-vapor phase operation, or it may be in a fixed-bed state (usually on a solid support) in a conventional flowing vapor-phase operation.

The time element in the process is not critical, and may generally be governed by practical considerations. The time required for a practical level of conversion of 2-methyl-3-butenenitrile to linear pentenenitriles is dependent upon the temperature of reaction, i.e., operation at lower temperature generally requires a longer time than operation at a higher temperature. A practical reaction time can be in the range of a few seconds to many hours, depending on the particular conditions and method of operation. The rate of conversion may also be affected by the amount of excess ligands.

The molar ratio of 2-methyl-3-butenenitrile to catalyst is generally greater than 1:1, usually in the range from about 10:1 to 2000:1, for a batch operation. However, it is usually in lower proportions, e.g., 1:2, for a continuous operation with a fixed-bed catalyst.

As stated above, U.S. Pat. No. 3,496,215 describes the use of the catalytic zero-valent nickel complex of the present invention in effecting hydrocyanation of pentenenitriles, including 2-methyl-3-butenenitrile. In the presence of hydrogen cyanide, the nickel complex preferentially catalyzes formation of a six-carbon saturated nitrile (2-methylglutaronitrile) from 2-methyl-3-butenenitrile. Because of the overriding competitive hydrocyanation reaction, in the practice of the present rearrangement isomerization reaction it is necessary to avoid the presence of large amounts of hydrogen cyanide, i.e., any amount of the order of or in excess of 1:1 mole ratio with the 2-methyl-3-butenenitrile starting material. However, hydrogen cyanide has no significant effect per se on the isomerization reaction and its presence in minor amounts in the starting material can be tolerated if necessary. The isomerization process is preferably conducted in the absence of hydrogen cyanide.

PREFERRED EMBODIMENTS OF THE INVENTION

There follow some nonlimiting examples illustrative of the process of the present invention. In these examples, unless otherwise noted, reaction pressures are autogenous. Analyses are made by gas chromatography and the percentages are expressed in terms of area. Gas chromatographic data expressed in area percent are approximations of weight percent. See Purnell, "Gas Chromatography," John Wiley and Sons, page 285 (1962).

The isomerizations are carried out in a three necked 50 ml round bottom blask fitted with a gas inlet above the liquid level, a thermometer and a gas exit tube through a reflux condenser, except for Example 1 wherein a 100 ml flask is used. Gas exit is through a bubbler to prevent contamination by air.

For operation the flask is charged with catalyst and 2-methyl-3-butenenitrile with a nitrogen purge. The system is purged with nitrogen then heated to reaction temperature. A small positive pressure of nitrogen is maintained during reaction.

The designations used in the Tables represent the following:

T2PN - trans-2-pentenenitrile
T3PN - trans-3-pentenenitrile
C3PN - cis-3-pentenenitrile
4PN - 4-pentenenitrile

EXAMPLE 1

To illustrate the effect of excess ligand on the isomerization of 2-methyl-3-butenenitrile to 3-pentennitrile the following experiments were run. Samples were taken at intervals and analyzed by gas chromatography. Analyses are corrected for dilutions. The starting material contains 2.88% of 3-pentenenitrile.

In Experiment (a), the glass reaction flask is charged in a nitrogen atmosphere with 0.32 g. of Ni-[P(OC$_6$H$_5$)$_3$]$_4$ and 50 ml of 2-methyl-3-butenenitrile. The mixture is maintained at 130°C. under a nitrogen atmosphere. In experiment (b) the glass reaction flask is charged with 0.32 g. of Ni[P(OC$_6$H$_5$)$_3$]$_4$, 0.31 g. of P(OC$_6$H$_5$)$_3$, and 50 ml of 2-methyl-3-butenenitrile and again is maintained at 130°C. under a nitrogen atmosphere. The molar ratio of ligand to catalyst is 4:1. The results are summarized in Table I. It will be seen that the conversion to linear pentenenitrile is greater when excess ligand is employed.

Table I

| | Experiment (a) No Excess Ligand | | | | | Experiment (b) Excess Ligand | | | |
|---|---|---|---|---|---|---|---|---|---|
| Hours | T2PN | T3PN | 4PN | C3PN | Hours | T2PN | T3PN | 4PN | C3PN |
| 98.3 | — | 4.538 | 0.016 | — | 98.3 | — | 4.890 | — | — |
| 124.6 | 0.010 | 4.750 | — | — | 124.6 | 0.050 | 5.580 | — | — |
| 143.4 | — | 5.188 | — | — | 143.4 | — | 6.010 | — | — |
| 164.4 | — | 5.363 | — | — | 164.4 | 0.048 | 6.670 | 0.054 | 0.056 |
| 191.1 | 0.002 | 5.879 | — | — | 191.1 | 0.048 | 7.370 | — | — |
| 260.3 | — | 7.609 | — | — | 260.3 | — | 11.280 | 0.220 | 0.110 |
| 284.3 | — | 8.384 | — | — | 284.3 | — | 14.032 | — | 0.254 |
| 308.3 | — | 10.261 | — | — | 308.3 | — | 23.418 | — | — |

EXAMPLES 2–4

The following examples further illustrate the isomerization of 2-methyl-3-butenenitrile (2M3BN) in the presence of nickel-phosphite complexes and the increased conversions effected with excess ligand being present. In each experiment 25 ml of 2M3BN is used; the (a) series being carried out with no excess ligand and the (b) series being carried out with excess ligand. In all cases the original 2M3BN contains 2.88% of 3-pentenenitrile (3PN). The results are summarized in Table II. Molar ratio for ligand to catalyst are respectively 4:1 for Example 2(b); 10:1 for Example 3(b); 4:1 for Example 4(b); and 5.3:1 for Example 4(b). Again it is seen that conversion to linear pentenenitrile is greater when added ligand is used.

predominantly cresols (meta- and para-cresols-85%). The desired nickel catalyst complex $Ni[P(TT)_3]_4$ in excess tricresyl phosphite $[(TT)_3P]$ separates as the lower layer from the mixture, substantially free of zinc chloride.

A charge of 20 ml of 2M3BN and 31 ml of the catalyst solution prepared as described above, containing 0.184 moles of nickel per liter and having a mole ratio of $P(TT)_3$ to $Ni[P(TT)_3]_4$ of 4.5, is placed in a glass tube sealed at one end and blanketed with nitrogen. The tube is closed and immersed in an oil bath held at 200°C. In five minutes 85% of the 2M3BN is converted to 3 PN and 4 PN. In similar isomerizations carried out without use of excess ligand at this high a temperature excessive catalyst degradation is experienced.

TABLE II

[Isomerization of 2-methyl-3-butenenitrile with nickel-phosphite complexes]

| Example | Complex | Grams | Reaction conditions | | Products, percent | | | |
|---|---|---|---|---|---|---|---|---|
| | | | Temperature, °C. | Time, hrs. | T 3 PN | C 3 PN | T 2 PN | 4 PN |
| 2(a) | $Ni[P(OC_6H_5)_3]_4$ | 0.32 | 130 | 23.5 | 11.02 | 0.05 | | 0.07 |
| 2(b) | $Ni[P(OC_6H_5)_3]_4$ / $P(OC_6H_5)_3$ | 0.32 / 0.31 | 130 | 23.5 | 28.7 | 0.16 | | |
| 3(a) | $Ni[P(O-CH(CH_3)_2)_3]_4$ | 0.9 | 80 | 22.5 | 28.3 | 1.31 | 0.47 | 0.94 |
| 3(b) | $Ni[P(O-CH(CH_3)_2)_3]_4$ / $P(OCH(CH_3)_2)_3$ | 0.9 / 2.2 | 80 | 22.5 | 34.1 | 2.98 | 0.64 | 1.49 |
| 4(a) | $Ni[P(O-C_6H_4-CH_3)_3]_4$ | 0.27 | 130 | 23.5 | 14.4 | 0.38 | 0.04 | 0.15 |
| 4(b) | $Ni[P(O-C_6H_4-CH_3)_3]_4$ / $P(O-C_6H_4-CH_3)_3$ | 0.27 / 0.26 | 130 | 23.5 | 14.8 | 0.26 | | |

EXAMPLE 5

This example illustrates the isomerization of 2-methyl-3-butenenitrile to a linear pentenenitrile in the presence of a mixed tritolyl phosphite/nickel catalyst complex. The catalyst is made by reaction for 2 hours at 110°C. in a flask under nitrogen, a mixture of 54 g. of $NiCl_2$, 27.5 g. of 325 mesh zinc dust, 1134 ml of adiponitrile and 1043 ml of a freshly distilled reaction product made by reacting $PCl_3$ with a mixture comprising

We claim:

1. In a process of isomerizing 2-methyl-3-butenenitrile to produce at least one linear pentenenitrile which comprises contacting 2-methyl-3-butenenitrile, at a temperature in the range of 10°–200°C. with a zerovalent nickel catalyst of the formula $Ni(PXYZ)_4$, wherein X is OR, Y and Z are of the group consisting of R and OR, R being of the group consisting of alkyl and aryl hydrocarbyl radicals of up to 18 carbon atoms and aryl hydrocarbyl radicals of up to 18 carbon atoms substituted with a radical of the group consisting of chloride and alkoxy radicals, wherein any two of X, Y and Z can be joined to form a lower alkylene or the ethylenedioxy group;

the improvement which comprises carrying out the process of isomerizing in the presence of at least a 1:1 mole ratio of a compound of the formula PXYZ to the catalyst of formula $Ni(PXYZ)_4$.

2. The process of claim 1 wherein Y and Z are OR.

3. The process of claim 2 wherein R is phenyl.

4. The process of claim 2 wherein R is para-tolyl.

5. The process of claim 2 wherein R is mixed meta- and para-tolyl.

* * * * *